United States Patent
Kumitani et al.

(10) Patent No.: US 11,499,512 B2
(45) Date of Patent: Nov. 15, 2022

(54) CONSTRUCTION MACHINE

(71) Applicant: KOBELCO CONSTRUCTION MACHINERY CO., LTD., Hiroshima (JP)

(72) Inventors: Kenjiro Kumitani, Hiroshima (JP); Ryota Nakahara, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 67 days.

(21) Appl. No.: 17/194,915

(22) Filed: Mar. 8, 2021

(65) Prior Publication Data

US 2021/0293208 A1 Sep. 23, 2021

(30) Foreign Application Priority Data

Mar. 17, 2020 (JP) .............................. JP2020-046681

(51) Int. Cl.
*F02M 35/022* (2006.01)
*F02M 35/08* (2006.01)
(Continued)

(52) U.S. Cl.
CPC ....... *F02M 35/02433* (2013.01); *B60K 11/06* (2013.01); *B60K 11/08* (2013.01); *E02F 9/0866* (2013.01); *F02M 35/084* (2013.01)

(58) Field of Classification Search
CPC ......... F02M 35/02433; F02M 35/0209; F02M 35/022; F02M 35/0223; F02M 35/0226;
(Continued)

(56) References Cited

U.S. PATENT DOCUMENTS

2007/0006827 A1* 1/2007 Chaney .................... F01P 11/12
123/41.12
2009/0151308 A1* 6/2009 Jung ................... F02M 35/022
55/337
(Continued)

FOREIGN PATENT DOCUMENTS

EP 1 744 028 A1 1/2007
EP 1 950 074 A1 7/2008
(Continued)

OTHER PUBLICATIONS

Extended European Search Report dated Sep. 15, 2021 in corresponding European Patent Application No. 211616909, 5 pages.

*Primary Examiner* — Jacob M Amick
(74) *Attorney, Agent, or Firm* — Oblon, McClelland, Maier & Neustadt, L.L.P.

(57) ABSTRACT

Provided is a construction machine capable of collecting foreign matter into a dust collection pocket and preventing the foreign matter from being scattered. The construction machine includes a cooler, an air passage forming member including a curved section, a dust-proof filter, a cooling fan generating a normal wind for cooling and a reverse wind opposite thereto, a dust collection pocket, and a turning member. The dust collection pocket has an opening and collects foreign matter at a position downstream of the inner wall surface of the outer corner of the curved section. The turning member is turned about a turning axis by the normal wind and the reverse wind, thereby being moved between a close position to close the opening and an open position to open the opening.

7 Claims, 11 Drawing Sheets

(51) Int. Cl.
*F02M 35/024* (2006.01)
*B60K 11/06* (2006.01)
*B60K 11/08* (2006.01)
*E02F 9/08* (2006.01)

(58) Field of Classification Search
CPC ...... F02M 35/08; F02M 35/084; B60K 11/06; B60K 11/08; E02F 9/0866
See application file for complete search history.

(56) References Cited

U.S. PATENT DOCUMENTS

| | | | |
|---|---|---|---|
| 2015/0027311 A1* | 1/2015 | Link | B01D 46/70 95/279 |
| 2017/0096971 A1* | 4/2017 | Kaufmann | F02M 35/02491 |
| 2018/0328320 A1* | 11/2018 | Lécuelle | F02M 35/0205 |
| 2019/0277227 A1* | 9/2019 | Larson | B01D 45/16 |

FOREIGN PATENT DOCUMENTS

| | | |
|---|---|---|
| JP | 2007-307464 A | 11/2007 |
| JP | 2020-121676 A | 8/2020 |

\* cited by examiner

CONSTRUCTION MACHINE

TECHNICAL FIELD d

The present invention relates to a construction machine such as a hydraulic excavator.

BACKGROUND ART

There is conventionally known a construction machine having a machine room. The machine room is disposed at the rear of an upper clewing body of the construction machine to house an engine, a cooler and a cooling fan for cooling the engine, and a dust-proof filter. The cooling fan generates a wind flowing in a normal direction from an intake port to the cooler, namely, a normal wind (a cooling wind). The dust-proof filter is attached to the cooler so as to be located upstream of the normal wind to collect foreign matter such as dust in the normal wind.

The foreign matter is deposited on the dust-proof filter to thereby block mesh holes of the dust-proof filter, hindering air from passing therethrough. This can cause overheating.

The need is thereby generated for performing cleaning to remove the foreign matter from the dust-proof filter. Especially, the use of a construction machine in an environment where dust or the like floats in a large amount, such as an industrial disposal site or a disassembly site, causes the necessity of frequent performance of the above-mentioned cleaning. This lowers the working efficiency of the construction machine.

Patent Document 1 (Japanese Unexamined Patent Application No. 2020-121676) discloses a construction machine provided with a dust-proof filter, the construction machine having a function of restraining deterioration in the work efficiency due to cleaning of the dust-proof filter. The construction machine, specifically, includes an intake cylinder and a dust collection pocket. The intake cylinder extends from the intake port to the intake chamber, having a curved section in the middle thereof. The dust collection pocket is located downstream of the inner wall surface of an outer corner part of the curved section. In the curved section, a part of or all of the relatively large foreign matter that may cause clogging, out of the foreign matter contained in the intake air, is separated by utilization of the inertia of the foreign matter and collected in the dust collection pocket.

Patent Document 2 (Japanese Unexamined Patent Application No. 2007-307464) discloses a recycling machine including a cooling fan and a dust-proof filter (dust-proof net). The cooling fan is rotatable in both normal and reverse directions. The cooling fan is rotated in the reverse direction to enable foreign matter such as dust adhering to the dust filter to be discharged with no requirement for artificial work. Specifically, the reverse rotation of the cooling fan generates a wind in a direction reverse to that of the normal cooling wind, namely, a reverse wind that flows from the downstream side of the cooling air toward the upstream side, which blows away the dust and the like that had adhered to the dust-proof filter to be accumulated and makes it drop. The thus dropped dust and the like are discharged to the outside of the machine room through a discharge port opened by opening of a lid.

The construction machine described in Patent Document 1 is, however, not designed in consideration with the generation of the reverse wind by the above-described reverse rotation of the cooling fan. If the cooling fan of this construction machine was reversely rotated to form a reverse wind, the reverse wind could blow up the foreign matter collected in the dust collection pocket to scatter it to the outside of the dust collection pocket.

The recycling machine described in Patent Document 2 is incapable of separating dust and the like from the cooling air to collect them, being capable of nothing but simply blowing the dust and the like from the dust-proof net and discharging the dust and the like. The reverse wind, therefore, may cause dust and the like to re-adhere to the dust-proof filter.

SUMMARY OF INVENTION

It is an object of the present invention to provide a construction machine capable of reliably cleaning a dust-proof filter and collecting foreign matter.

Provided is a construction machine including: a machine room that houses an engine; a cooler disposed inside the machine room to cool the engine; an air passage forming member; a cooling fan; a dust-proof filter; a dust collection pocket; and a turning member. The air passage forming member forms an air passage from an intake port to the machine room. The cooling fan is capable of generating both a normal wind that flows from the intake port toward the cooler through the air passage and a reverse wind that flows from the cooler toward the intake port through the air passage, The cooling fan is located downstream of the cooler with respect to a normal wind direction in which the normal wind flows, and blows away foreign matter adhering to the dust-proof filter by the reverse wind. The air passage forming member includes a curved section having a curved shape in the middle of the air passage, the curved section having a shape capable of separating foreign matter that passes through the curved section from a cooling wind by use of the inertia of the foreign matter. The dust-proof filter is provided between the air passage forming member and the cooler to capture foreign matter contained in the normal wind. The dust collection pocket is located at a position shifted downstream in the normal wind direction along the normal wind direction from an inner wall surface of an outer corner part of the curved section. The dust collection pocket has an opening that opens to an upstream side in the normal wind direction and a bottom that closes on a downstream side in the normal wind direction, being configured to take in and collect the foreign matter separated in the curved section through the opening. The turning member includes a lid section capable of closing the opening, provided in the air passage forming member so as to be turnable about a turning axis intersecting the normal wind direction to be thereby movable between an open position and a close position. The lid section opens the opening in the open position and closes the opening in the close position. The turning member is configured to be turned to the open position by the normal wind and to be turned to the close position by the reverse wind.

DESCRIPTION OF EMBODIMENTS

Hereinafter, preferred embodiments will be described with reference to the drawings.

Figure 1:
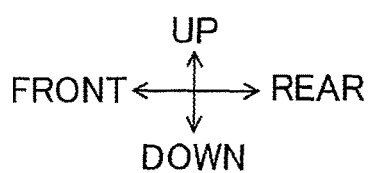
FIG. 1 is a side view showing a construction machine according to each embodiment of the present invention.
Figure 1:
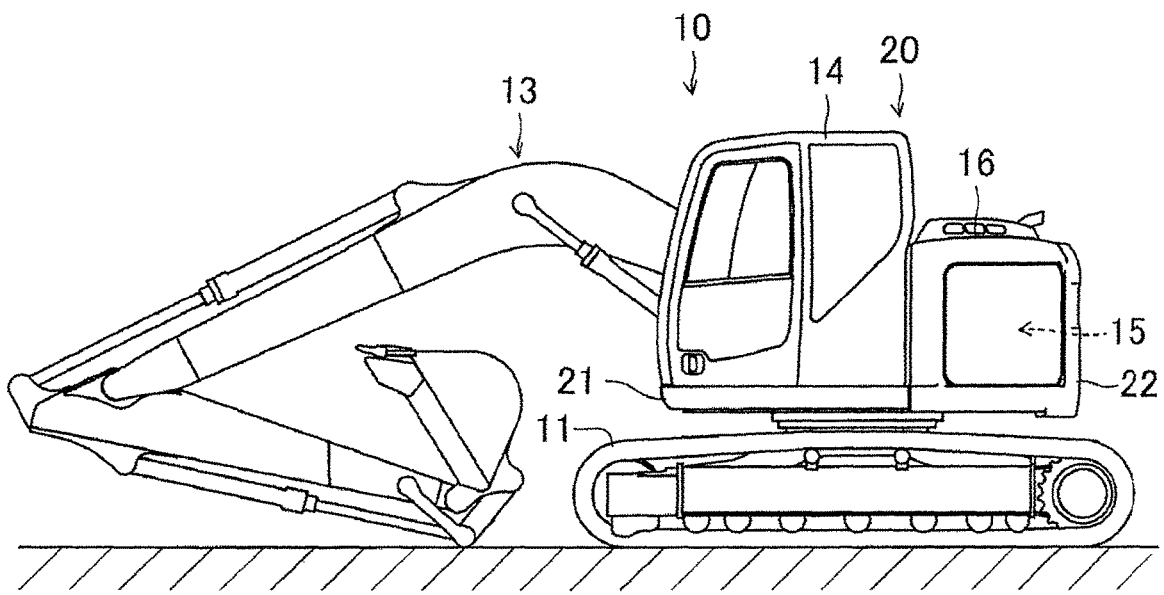
Figure 2:
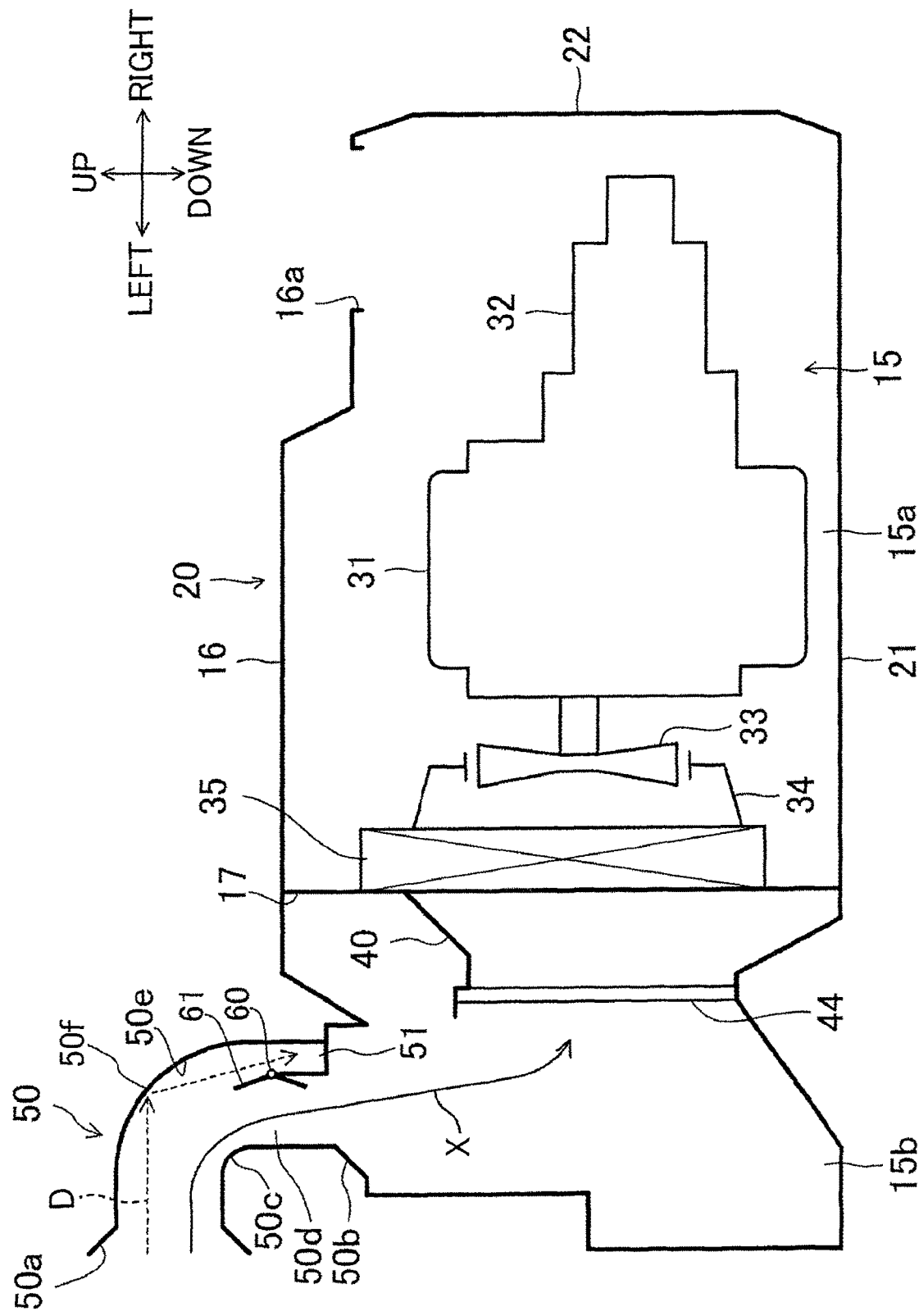
FIG. 2 is a cross-sectional rear view showing a main part of the construction machine.

FIG. 1 is a side view of a construction machine 10 according to each embodiment, and FIG. 2 is a cross-sectional rear view showing a main part of the construction machine.

The construction machine 10 is, for example, a hydraulic excavator, including a crawler type of lower traveling body 11, an upper slewing body 20 mounted on the lower traveling body 11 so as to be slewable, and an attachment 13. The upper stewing body 20 includes a cab 14, a machine room 15, an upper frame 21, and a counterweight 22. The construction machine 10 is, for example, a small-slewing-radius type hydraulic excavator with a small stewing radius given to the upper slewing body 20.

The upper frame 21 composes a lower part of the upper slewing body 20. The cab 14 and the machine room 15 are mounted on the upper frame 21. The cab 14 defines an operation room having, for example, a rectangular shape, being mounted on the upper frame 21 to be adjacent to the attachment 13.

The machine room 15 is located at the rear of the upper slewing body 20. The machine room 15 has a housing space, which is defined by the counterweight 22 and the machine room cover 16. The counterweight 22 has a shape along an outer peripheral edge of the rear part of the upper slewing body 20. The machine room cover 16 covers the housing space from above.

The machine room 15 houses an engine 31, a hydraulic pump 32, and a cooling device for cooling the engine 31. The cooling device includes a cooler 35, a cooling fan 33, a fan shroud 34 and an intake duct 40. The cooling fan 33 is capable of generating a normal wind X, which will be described later in detail. The intake duct 40, the cooler 35, the cooling fan 33, the engine 31 and the hydraulic pump 32 are arranged laterally in this order from the upstream side in a normal wind direction which is the direction in which the normal wind X flows.

Inside the machine room 15, a wall portion 17 is disposed. The wall portion 17 extends vertically so as to partition the housing space of the machine room 15 into an engine chamber 15a and an intake chamber 15b. The engine chamber 15a is located upstream of the wall portion 17 in the normal wind direction, housing the cooler 35, the cooling fan 33 and the engine 31. The intake chamber 15b is located downstream of the wall portion 17 in the normal wind direction, housing the intake duct 40.

Figure 3:
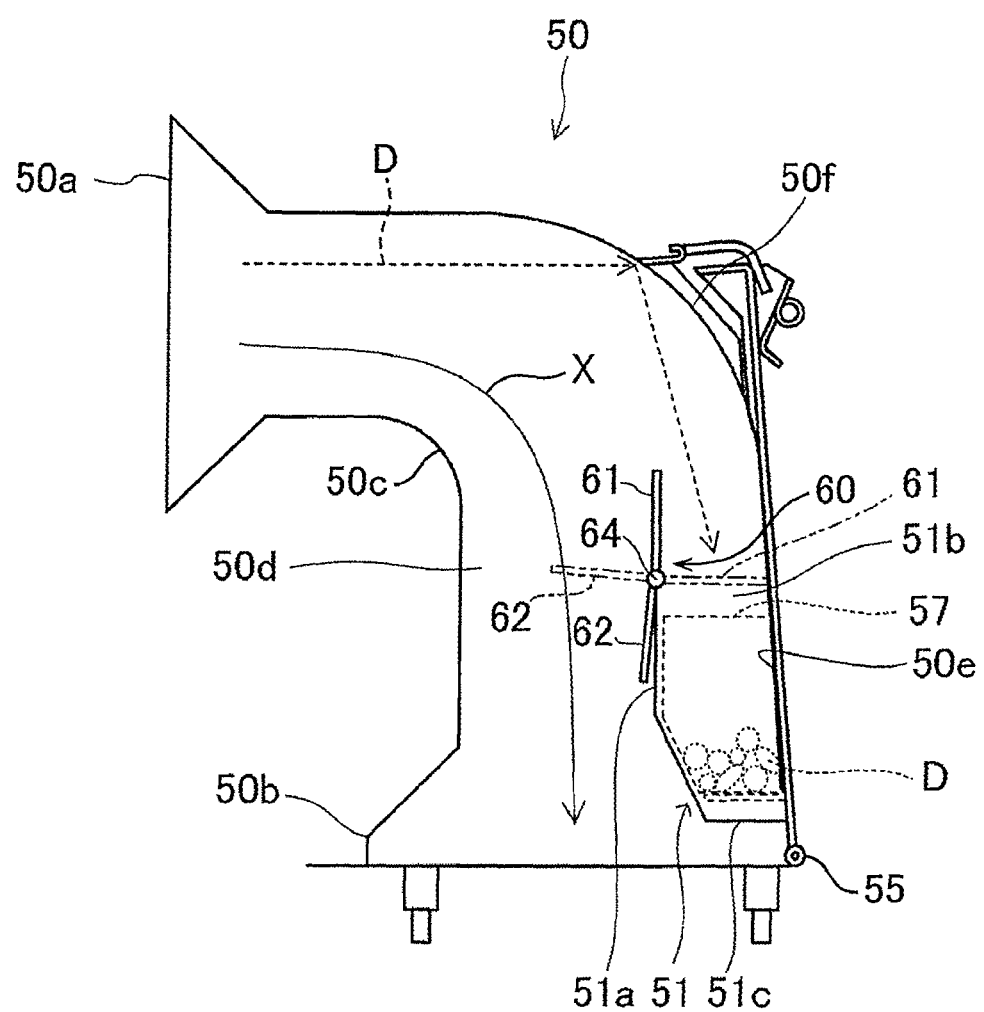
FIG. 3 is a cross-sectional rear view showing a normal wind passing through an air passage in the construction machine according to the first embodiment of the present invention.
Figure 4:
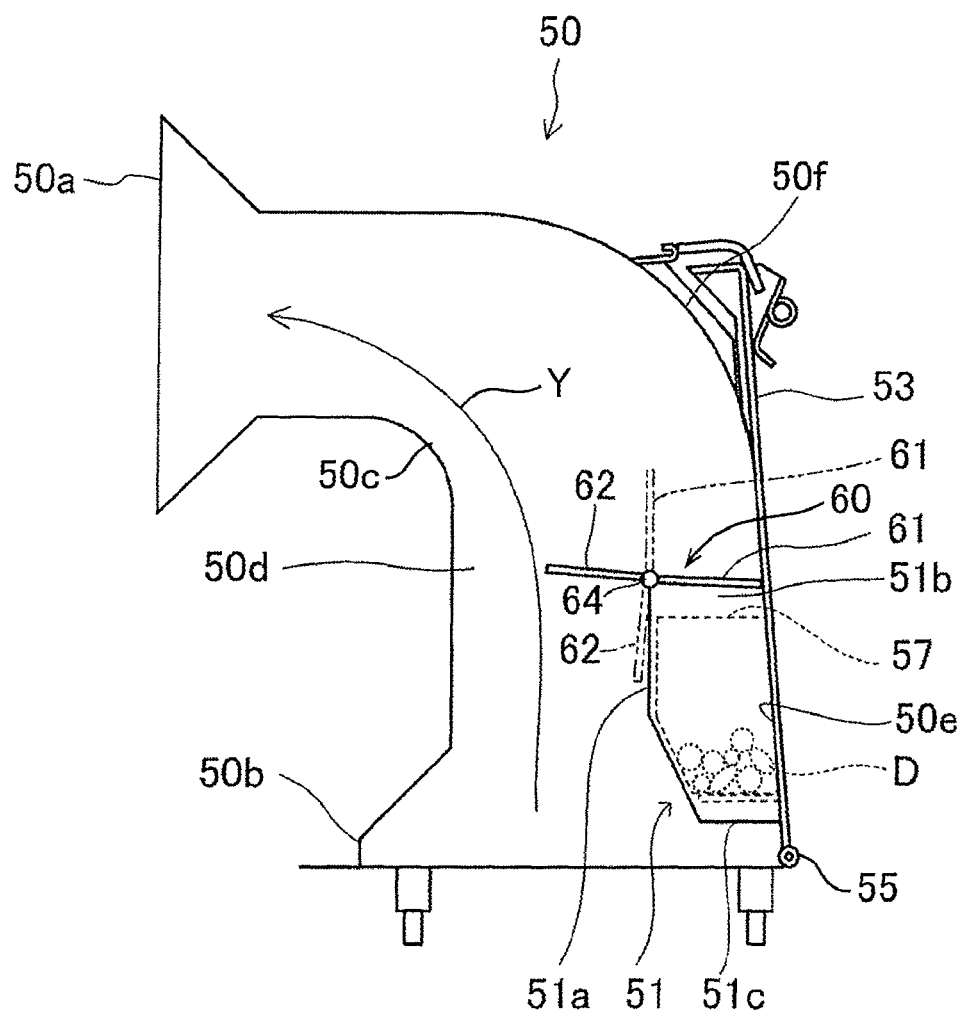
FIG. 4 is a cross-sectional rear view showing a reverse wind passing through the air passage according to the first embodiment.
Figure 5:
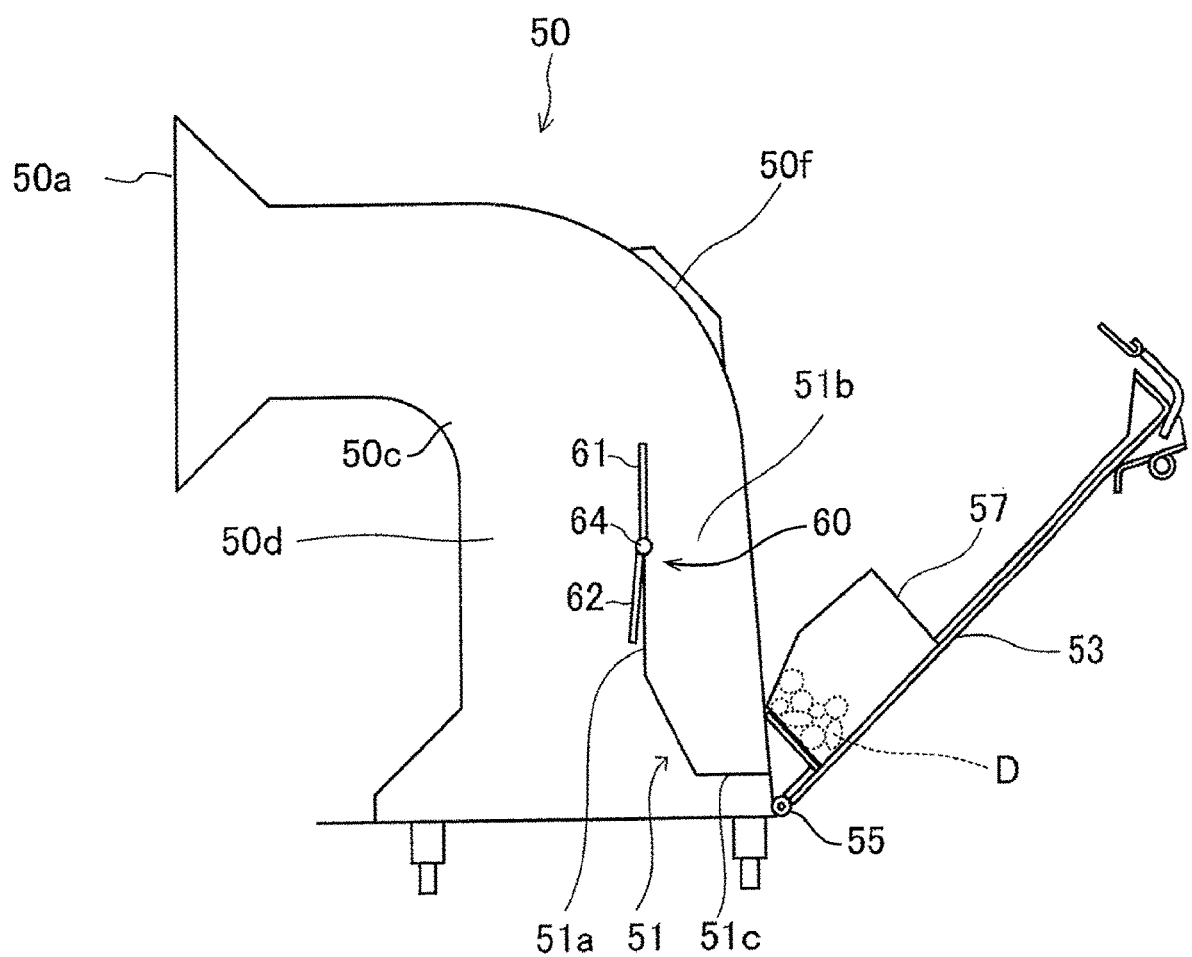
FIG. 5 is a cross-sectional rear view showing a state in which the dust collection case is taken out from the air passage fainting member according to the first embodiment.

The construction machine 10 further includes an intake cylinder 50 shown in FIGS. 3 to 5. The intake cylinder 50 is a cylindrical body enclosing an air passage 50d, being connected to the machine room 15. The intake cylinder 50 has opposite ends each of which is opened. One of the opposite ends encloses an intake port 50a which opens to the outside of the machine room 15, while the other of the opposite ends composes a connection part 50b to be connected to the machine room 15. The intake cylinder 50, thus, serves as an air passage forming member which forms a passage for the normal wind X from the intake port 50a to the inside of the machine room 15, namely, the air passage 50d. The connection part 50b is connected to the machine room cover 16 in communication with an intake opening which is formed in the machine room cover 16. The intake opening is provided in the upper left part of an intake region of the machine room cover 16, the intake region forming the top wall of the air intake chamber 15b. On the other hand, an exhaust port 16a is provided on the upper right part of an engine region of the machine room cover 16, the engine region forming the top wall of the engine chamber 15a, to allow air to be discharged to the outside of the machine room 15 through the exhaust port 16a.

The cooler 35 is composed of a heat exchanger for cooling the engine 31, for example, a radiator. The cooler 35 has a core surface, disposed so as to orient the core surface in the machine lateral direction.

The cooling fan 33 is rotatable in both a normal rotational direction and a reverse rotational direction opposite thereto. The cooling fan 33 is rotated in the normal rotational direction to thereby generate the normal wind X and rotated in the reverse rotational direction to thereby generate the reverse wind Y. The normal wind X is a cooling wind, which flows in a direction from the intake port 50a of the intake cylinder 50 toward the cooler 35 through the air passage 50d and the intake duct 40. The reverse wind Y is a wind that flows in a direction from the cooler 35 toward the intake port 50a through the air passage 50d of the intake cylinder 50 and the intake duct 40, i.e., a wind reverse to the normal wind X. Both the normal wind X and the reverse wind Y pass through the air passage 50d.

The engine 31 includes a horizontal drive shaft. The cooling fan 33 is connected to one of the opposite ends of the drive shaft (the left end in FIG. 2) to be rotationally driven by the engine 31. The cooling fan 33 is located downstream of the cooler 35 in the normal wind direction, specifically, located between the engine 31 and the cooler 35. The fan shroud 34 is disposed to enclose the cooling fan 33 and guides an air that have passed through the cooler 35 to the engine 31. The hydraulic pump 32 is connected to the other of the opposite ends of the drive shaft of the engine 31 (the right end in FIG. 2).

The intake duct 40 is located between the air passage 50d and the cooler 35. The intake duct 40 is a duct that encloses the space on the intake side of the cooler 35 so as to seal the space. The dust-proof filter 44 is disposed so as to close the intake port of the intake duct 40, and configured to capture the foreign matter D having a large diameter while allowing the normal wind X to pass through the dust-proof filter 44. The foreign matter D with the large diameter is dust or the like having a large size enough to cause clogging in the cooler 35 or the like.

In the construction machine 10, the cooling fan 33 being driven in the normal rotational direction by the engine 31 generates the flow of air from the left side of FIG. 2 to the right side inside the machine room 15, namely, the normal wind X. The normal wind X functions as a cooling wind. Specifically, a heat exchange is performed between the air constituting the normal wind X and a refrigerant flowing in the cooler 35, allowing the refrigerant to be cooled to cool the engine 31 and the like. Specifically, the cooling fan 33 being rotated in the normal rotational direction takes in an outside air through the intake port 50a of the intake cylinder 50, thereby generating the normal wind X flowing inside the machine room 15. The air constituting the normal wind X passes through the air passage 50d in the intake cylinder 50, the intake chamber 15b, the dust-proof filter 44 and the intake duct 40 to enter the engine chamber 15a. The air absorbs the heat of the refrigerant flowing through the cooler 35 when passing through the cooler 35 to become hot air, being discharged to the outside of the machine room 15 through the exhaust port 16a.

The cooling fan 33 is rotationally driven in the reverse rotational direction in order to perform cleaning of the dust-proof filter 44. The cooling fan 33 thus rotated in the reverse rotational direction generates an air flow from the cooling fan 33 toward the intake port 50a through the dust-proof filter 44 (from the right side to the left side in FIG. 2), namely, the reverse wind Y. The reverse wind Y blows away foreign matter that had adhered to the upstream side surface of the dust-proof filter 44, that is, the upstream side surface in the normal wind direction out of opposite surfaces of the dust-proof filter 44, thereby enabling the dust-proof filter 44 to be cleaned.

Besides the dust-proof filter 44, the construction machine 10 according to the present embodiment includes a mechanism for collecting foreign matter contained in intake air that is taken in from the outside. Specifically, the intake cylinder 50 includes a curved section 50c, and the construction machine 10 further includes a dust collection pocket 51 and a turning member 60.

The curved section 50c has a curved shape between the intake port 50a and the connection part 50b. More specifically, the curved section 50c according to this embodiment is curved at a substantially right angle so that a downstream section downstream of the curved section 50c in the normal wind direction including the connection part 50b extends vertically while an upstream section upstream of the curved section 50c including the intake port 50a is directed horizontally (that is, in the right-left direction in FIGS. 2 and 3).

A part of or all of the foreign matter D having a large diameter out of the foreign matter that is contained in the normal wind X having passed through the air passage 50d is, as shown by broken line arrows in FIGS. 2 and 3, prevented from making a sufficient turn in the curved section 50c by the inertia of the foreign matter D with the large diameter and the centrifugal force acting thereon, thereby brought into collision with an inner wall surface of an outer corner part 50f. The outer corner part 50f is a part of the cylindrical wall composing the curved section 50c in the intake cylinder 50, the part being located on the outer side of the air passage 50d with respect to the direction of the curvature radius of the curved section 50c. The foreign matter D thus separated from the normal wind X and brought into collision with the inner wall surface is advanced downstream in the normal wind direction along the normal wind direction from the inner wall surface (that is, descended in FIG. 3), being collected into the dust collection pocket 51 ahead thereof.

The dust collection pocket 51 is thus provided at a position where the dust collection pocket 51 can receive the foreign matter D. The dust collection pocket 51, specifically, as shown in FIG. 3, is defined by a downstream-side inner wall surface 50e of the intake cylinder 50 and a partition wall 51a. The downstream-side inner wall surface 50e is an inner wall surface of the intake cylinder 50 in a position shifted downstream of the normal wind direction along the normal wind direction from the inner wall surface of the outer corner part 50f of the curved section 50c. The partition wall 51a has a shape covering a pocket space at a position on the inner side of the downstream-side inner wall surface 50e. The dust collection pocket 51 has an opening 51b which opens to the upstream side in the normal wind direction (that is, upper side in FIG. 3), and a bottom part 51c which closes on the downstream side in the normal wind direction (that is, lower side in FIG. 3).

The turning member 60 includes a support shaft 64, a lid section 61, and a wind receiving section 62. The lid section 61 and the wind receiving section 62, each of which is formed of a plate-like member, extend from the support shaft 64 in respective directions opposite to each other.

The support shaft 64 extends in a direction intersecting the normal wind direction (in the vertical direction in FIG. 3), specifically, in the direction perpendicular to the normal wind direction in this embodiment (that is, longitudinal direction or depth direction in FIG. 3). The turning member 60 is supported at a position above the dust collection pocket 51, so as to be turnable about a turning axis which is a central axis of the support shaft 64. The turning member 60 is preferably supported by an upper part of the partition wall 51a.

The lid section 61 extends from the support shaft 64 toward the above of the dust collection pocket 51 in the direction perpendicular to the support shaft 64, namely, a turning radius direction of the turning member 60. The lid section 61 has an enough size to cover the opening 51b.

The turning member 60, turning about the support shaft 64, is movable between a close position indicated by a two-dot chain line and an open position indicated by a solid line in FIG. 3. At the open position, the lid section 61 extends upward from the support shaft 64 to open the opening 51b. At the close position, the lid section 61 extends horizontally from the support shaft 64 to cover the opening 51b.

The wind receiving section 62 receives the normal wind X and the reverse wind Y in the intake cylinder 50, thereby turning the entire turning member 60 between the open position and the close position. The wind receiving section 62 is located apart from the lid section 61 in a turning direction. The turning direction is a direction in which the turning member 60 is turned. The wind receiving section 62 is integrally connected to the lid section 61 through the support shaft 64. For example, the lid section 61 and the wind receiving section 62 are substantially aligned across the support shaft 64.

When the normal wind X flows in the air passage 50d in a state where the wind receiving section 62 extends horizontally to cover the air passage 50d as indicated by the two-dot chain line in FIG. 3, a downward force is applied to the wind receiving section 62 by the normal wind X, thereby turning the turning member 60 so as to move the wind receiving section 62 from the upstream side to the downstream side in the normal wind direction (downward in FIG. 3). The turning member 60 is thereafter held at such a position that the wind receiving section 62 is close to the outer surface of the partition wall 51a as indicated by a solid line, namely, the open position, at which the lid section 61 opens the opening 51*b* of the dust collection pocket 51 upward.

When the reverse wind Y flows through the air passage 50*d* in a state where the turning member 60 is in the open position, conversely, an upward force is applied to the wind receiving section 62 by the reverse wind Y, thereby turning the turning member 60 so as to move the wind receiving section 62 from the downstream side to the upstream side in the normal wind direction (upward in FIG. 3). The turning member 60 is thereafter held at a position where the distal end of the lid section 61 is close to the downstream-side inner wall surface 50*e* as indicated by a two-dot chain line, namely, the close position, at which the lid section 61 covers the opening 51*b* of the dust collection pocket 51 from above.

The cylinder wall of the intake cylinder 50 according to this embodiment includes a specific portion, which forms a door 53 shown in FIG. 3. The specific portion is a portion including the downstream-side inner wall surface 50*e*, that is, a portion including a portion defining the dust collection pocket 51. The door 53 is swingable outward relatively to the main body portion of the cylindrical wall of the intake cylinder 50, i.e., the portion other than the door 53, to be thereby moved between a door closing position shown in FIG.3 and FIG.4 and a door opening position shown in FIG. 5. In the example shown in FIGS. 3 to 5, the door 53 has a lower end connected to the connection part 50*b* so as to be swingable about a support shaft 55 extending horizontally (in the front-rear direction or depth direction in FIG. 3). Meanwhile, a lock mechanism 58 is provided to the upper end of the door 53 and configured to be detachably engaged with the main body portion to thereby lock the door 53 at the door closing position.

At the door closing position shown in FIGS. 3 and 4, the door 53 is substantially upright, allowing the dust collection pocket 51 to exert its original function in the suction cylinder 50. The dust collection pocket 51, specifically, is allowed to receive the foreign matter D having been separated from the normal wind X and coming downward in the curved section 50*c* and to collect it.

On the other hand, at the door opening position shown in FIG. 5, the door 53 is tilted outward, exposing the dust collection pocket 51 to the outside of the intake cylinder 50. This allows the foreign matter D accumulated in the dust collection pocket 51 to be easily taken out. The dust collection pocket 51 according to this embodiment has a double structure, further including a dust collection case 57 disposed on the further inner side of the partition wall 51*a*. The dust collection case 57 is detachably attached to the downstream-side inner wall surface 50*e* in a posture of opening upward through the opening 51*b* to receive the foreign matter D coming downward through the opening 51*b*. This allows the foreign matter D accumulated in the dust collection case 57 in the dust collection pocket 51 to be easily taken out together with the dust collection case 57 through removal of the dust collection case 57 from the dust collection pocket 51 with the door 53 at the door opening position.

In the thus configured construction machine 10 according to the first embodiment, accompanying the generation of the normal wind X by the cooling fan 33, a part of or all of the foreign matter contained in the outside air introduced into the air passage 50*d* through the intake port 50*a* is separated from the outside air in the curved section 50*c* in the middle of the air passage 50*d* by utilization of the inertia of the foreign matter. In addition, the thus separated foreign matter can be collected in the dust collection pocket 51 located at a position shifted downstream in the normal wind direction along the normal wind direction from the outer corner part 50*f* of the curved section 50*c*.

Furthermore, in the construction machine 10, accompanying respective flows of the normal wind X and the reverse wind Y through the air passage 50*d*, the turning member 60 is turned to be switched between the open position in which the lid section 61 opens the opening 51*b* of the dust collection pocket 51 and the close position in which the lid section 61 covers the opening 51*b*, which makes it possible not only to collect the foreign matter D into the dust collection pocket 51 but also to prevent the foreign matter thus collected in the dust collection pocket 51 from being scattered to the outside of the dust collection pocket 51. Specifically, when the normal wind X passes through the air passage 50*d*, the turning member 60 opens the opening 51*b* to thereby allow the foreign matter D to be introduced into the dust collection pocket 51 through the opening 51*b*; in contrast, when the reverse wind Y passes through the air passage 50*d*, the turning member 60 closes the opening 51*b* to thereby prevent the foreign matter D from being scattered to the outside of the dust collection pocket 51 through the opening 51*b*. This prevents the collected foreign matter D in the dust collection pocket 51 from being blown up by the reverse wind Y to be scattered to the outside of the dust collection pocket 51. Furthermore, the actions of the lid section 61 to open and close the opening 51*b* is automatically caused in conjunction with the occurrence of the normal wind X and the reverse wind Y, respectively.

Figure 6:
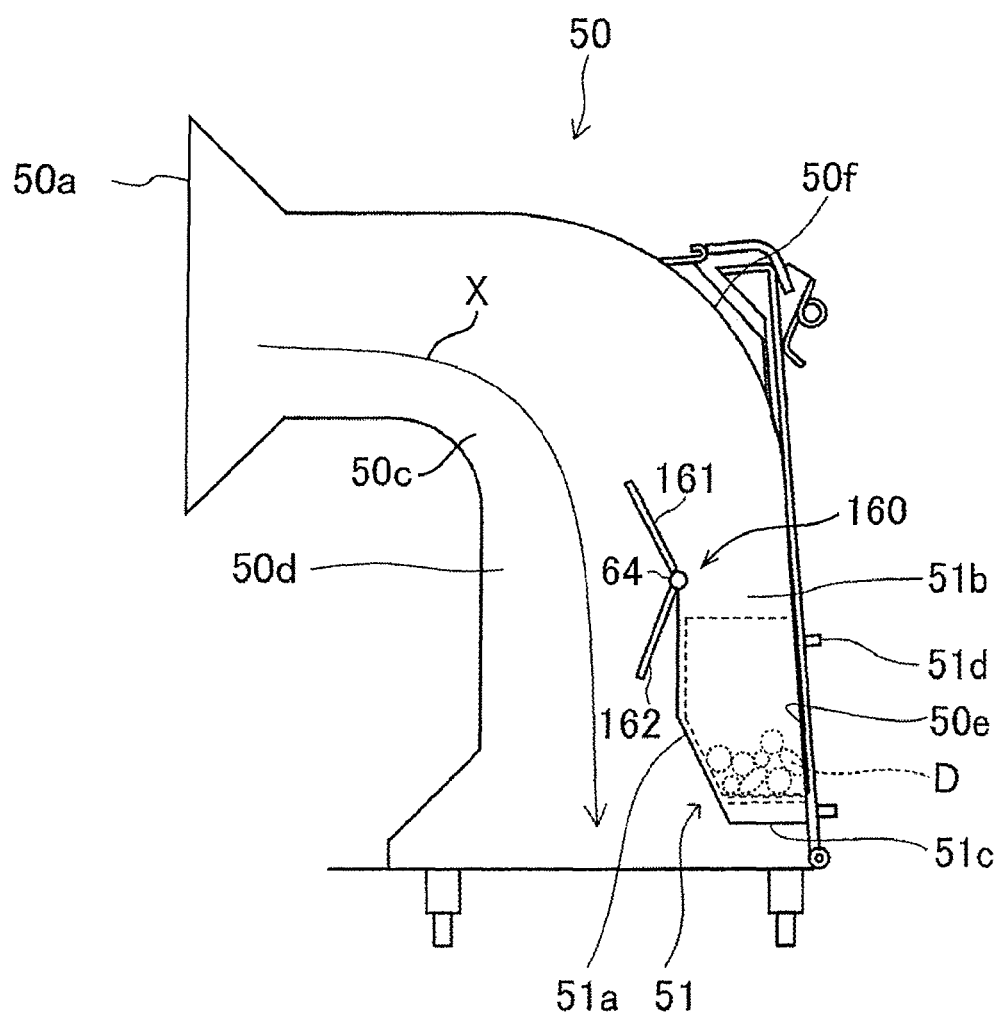
FIG. 6 is a cross-sectional rear view showing a normal wind passing through an air passage according to a second embodiment of the present invention.
Figure 7:
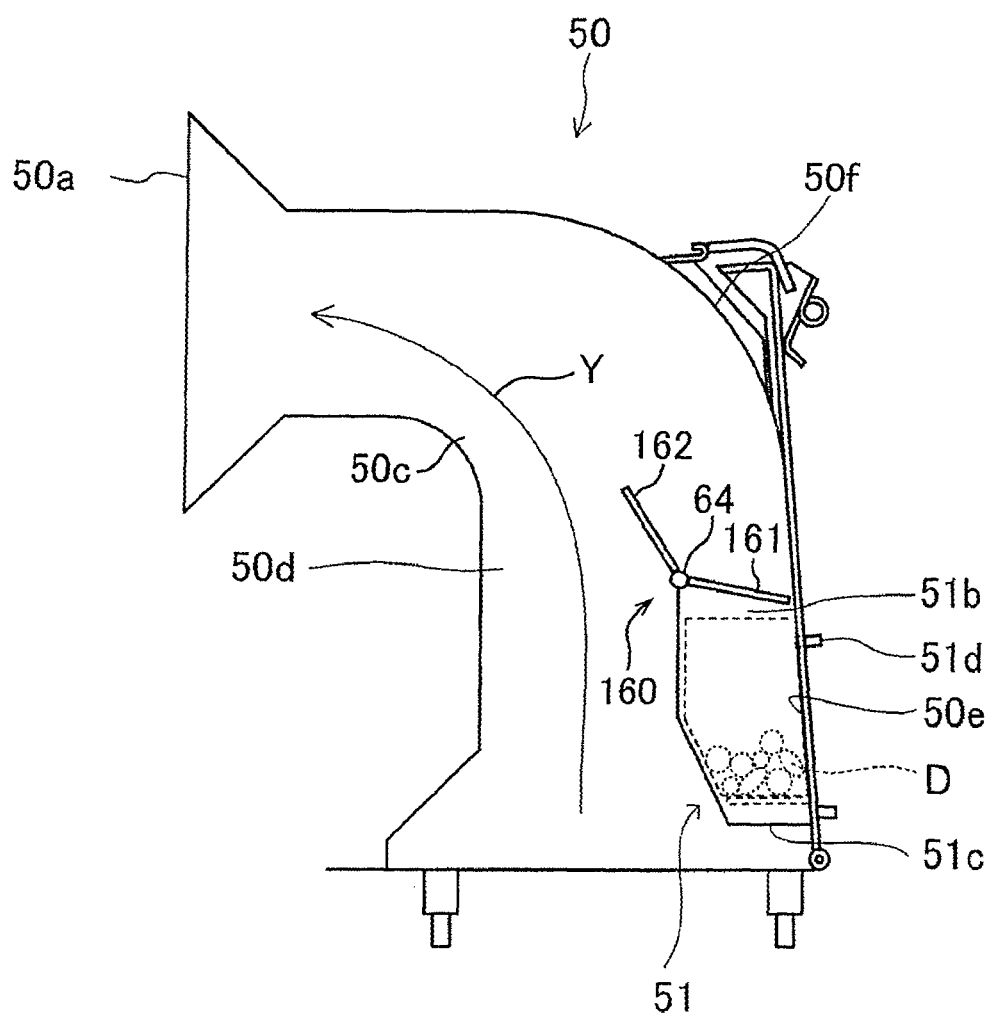
FIG. 7 is a cross-sectional rear view showing a reverse wind passing through the air passage according to the second embodiment.

FIGS. 6 and 7 show the inside of the intake cylinder 50 of the construction machine 10 according to a second embodiment of the present invention. In the second embodiment, a dust collection pocket 51 and a turning member 160 are provided in an intake cylinder 50, and the turning member 160 has a lid section 161 and a wind receiving section 162, similarly to the first embodiment; however, the angle that the lid section 161 and the wind receiving section 162 form therebetween in the turning direction, namely, a turning direction angle, is different from that in the first embodiment. With respect to the embodiments that will be described below, the same reference numerals are given to the same parts as those shown in FIGS. 3 and 4, and a detailed description thereon is omitted.

While the lid section 61 and the wind receiving section 62 of the turning member 60 according to the first embodiment are aligned so as to extend substantially in a straight line, that is, the turning direction angle formed between the lid section 61 and the wind receiving section 62 in the turning direction is 180 degrees, the turning direction angle formed between the lid section 161 and the wind receiving section 162 according to the second embodiment is smaller than 180 degrees. The turning direction angle is set to an angle to reduce the resistances of the lid section 61 and the wind receiving section 62 against the normal wind X and the reverse wind Y, respectively, in comparison with the first embodiment.

Specifically, the turning direction angle is set, as shown in FIG. 6, so as to direct the distal end of the lid section 161 toward the intake port 50*a* obliquely above, that is, so that the lid section 161 extends obliquely upward from the support shaft 64 of the turning member 160, in a state where the lid section 161 is made open the opening 51*b* by the normal wind X flowing through the air passage 50*d* defined by the intake cylinder 50. In this state, where the lid section 161 extends in a direction substantially equal to the direction in which the normal wind X flows around the lid section 161, the resistance of the lid section 161 against the normal wind X is small.

On the other hand, the turning direction angle is set, as shown in FIG. 7, so as to direct the distal end of the wind receiving section 162 toward the intake port 50a obliquely upward, that is, so that the wind receiving section 162 extends obliquely upward from the support shaft 64 of the turning member 160, in a state where the lid section 161 is made cover the opening 51b by the reverse wind Y flowing through the air passage 50d. In this state, where the wind receiving section 162 extends in a direction substantially equal to the direction in which the reverse wind Y flows around the wind receiving section 162, the resistance of the wind receiving section 162 against the reverse wind Y is also small.

According to the construction machine 10 of the second embodiment, the respective resistances of the lid section 161 and the wind receiving section 162 given to the normal wind X and the reverse wind Y, respectively, can be thus reduced as compared with the first embodiment in which the turning direction angle formed between the lid section 61 and the wind receiving section 62 in the turning direction is 180°.

Figure 8:
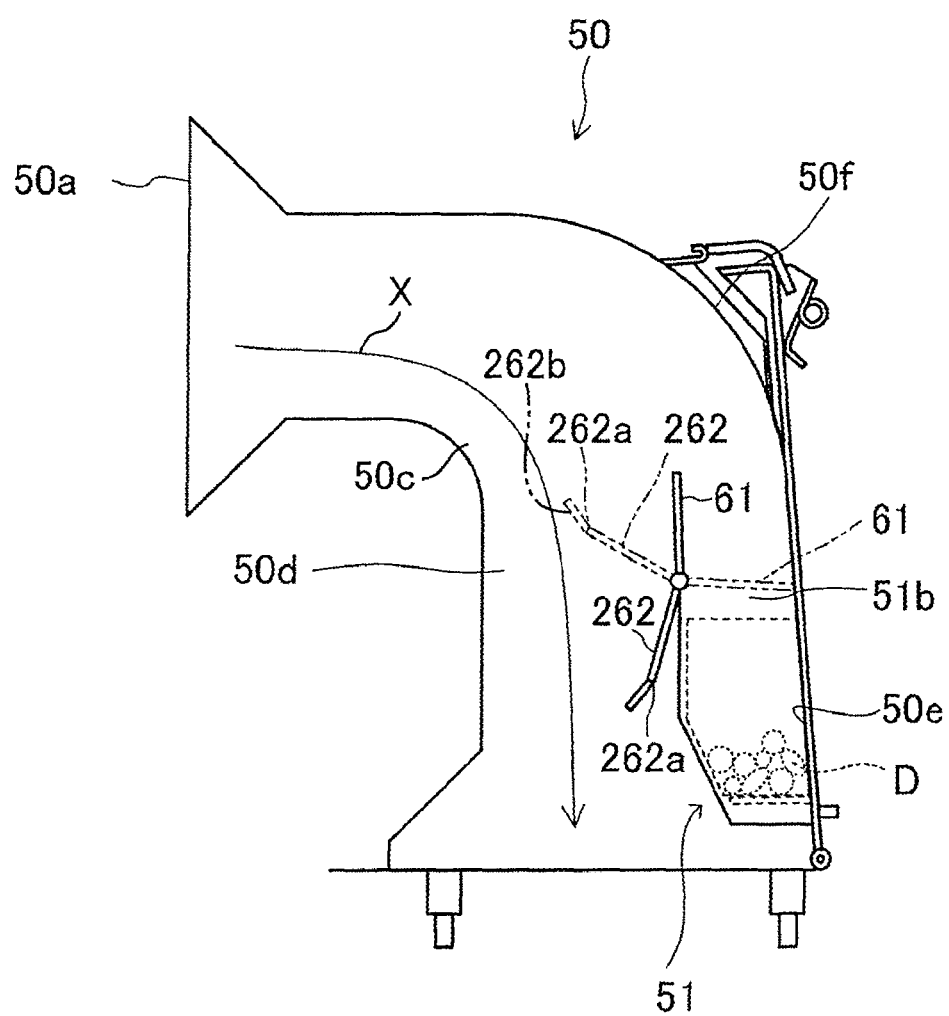
FIG. 8 is a cross-sectional rear view showing a normal wind passing through an air passage according to a third embodiment of the present invention.
Figure 9:
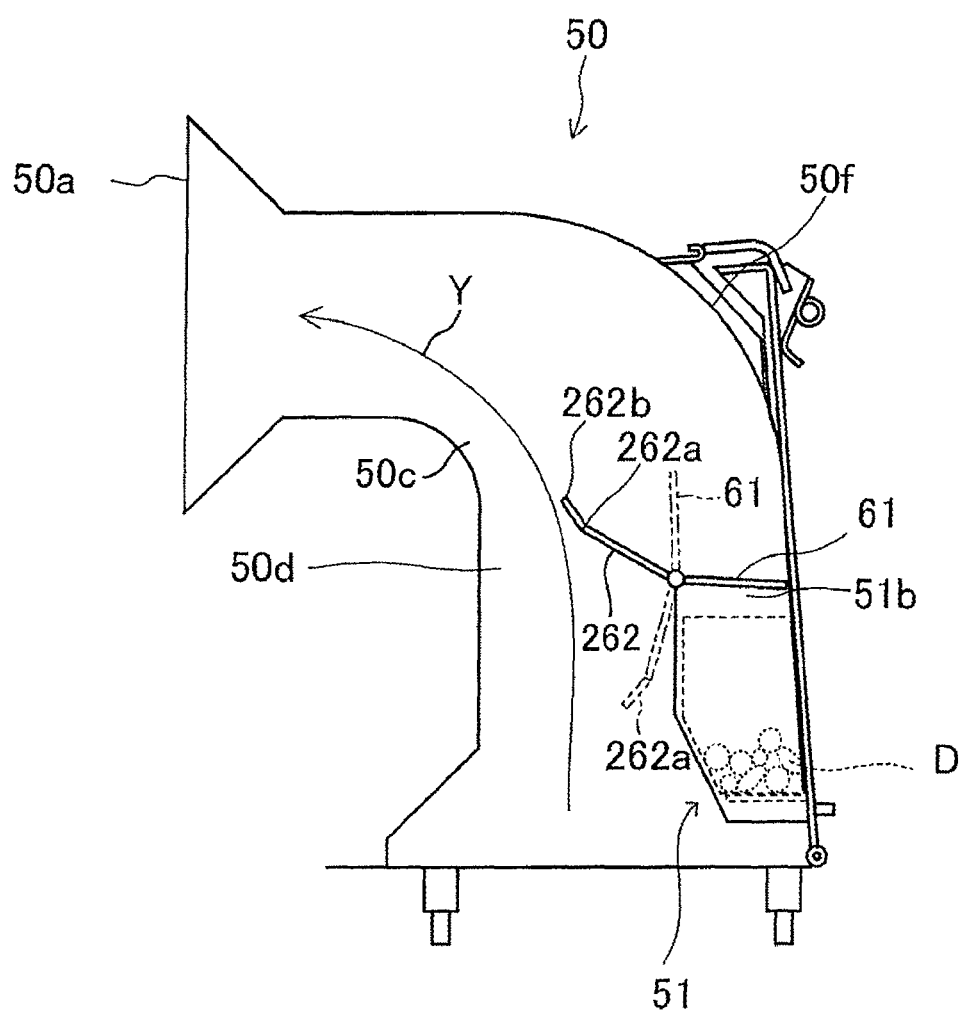
FIG. 9 is a cross-sectional rear view showing a reverse wind passing through an air passage according to the third embodiment.

The dust collection pocket 51 is preferably provided with a ventilation hole 51d as shown in FIGS. 6 and 7. The ventilation hole 51d provides communication between the air passage 50d and the outside of the intake cylinder 50 and the machine room 15, thereby allowing the inside of the dust collection pocket 51 to be depressurized. The ventilation hole 51d allows the inside of the dust collection pocket 51 to be in communication with the outside even when the lid section 161 closes the opening 51b. The thus allowed depressurization in the dust collection pocket 51 through the ventilation hole 51d assists the lid section 161 to close the opening 51b of the dust collection pocket 51 when the reverse wind Y flows, thereby enhancing the effect of preventing the foreign matter D that is collected into the dust collection pocket 51 when the normal wind X occurs from being pushed out to the outside of the dust collection pocket 51 by the pressure of the reverse wind Y FIGS. 8 and 9 show the inside of an intake cylinder 50 of a construction machine 10 according to a third embodiment of the present invention. In the third embodiment, a dust collection pocket 51 and a turning member 260 are provided in an intake cylinder 50, and the turning member 260 includes a lid section 261 and a wind receiving section 262, similarly to the first embodiment; however, the wind receiving section 262 has a different shape from that of the wind receiving section 62 according to the first embodiment.

Specifically, the wind receiving section 262 according to the third embodiment includes a flexure 262a. The flexure 262a is located on the inner side of the tip of the wind receiving section 262 in the turning radius direction, preferably, at a position slightly closer to the tip.

The wind receiving section 262 has a shape of being bent at an obtuse angle at the flexure 262a. Specifically, as indicated by a two-dot chain line in FIG. 8, the direction and the angle of bending at the flexure 262a are set to direct a distal side part 266b of the wind receiving section 262, that is, the part closer to the distal end than the flexure 262a, to the upstream side in the normal wind direction (more upward in FIG. 8) relatively to the other part, in the close position in which the lid section 61 of the turning member 260 closes the opening 51b of the dust collection pocket 51.

As shown in FIG. 8, the flexure 262a makes the distal side part 266b of the wind receiving section 262 more likely to receive a force from above by the normal wind X, thereby assisting the lid section 61 to open the opening 51b. On the other hand, as indicated by the two-dot chain line in FIG. 9, the flexure 262a makes the distal side part 266b of the wind receiving section 262 more likely to receive a force from below by the reverse wind Y in a state where the opening 51b is opened, thereby assisting the lid section 61 to close the opening 51b.

Figure 10:
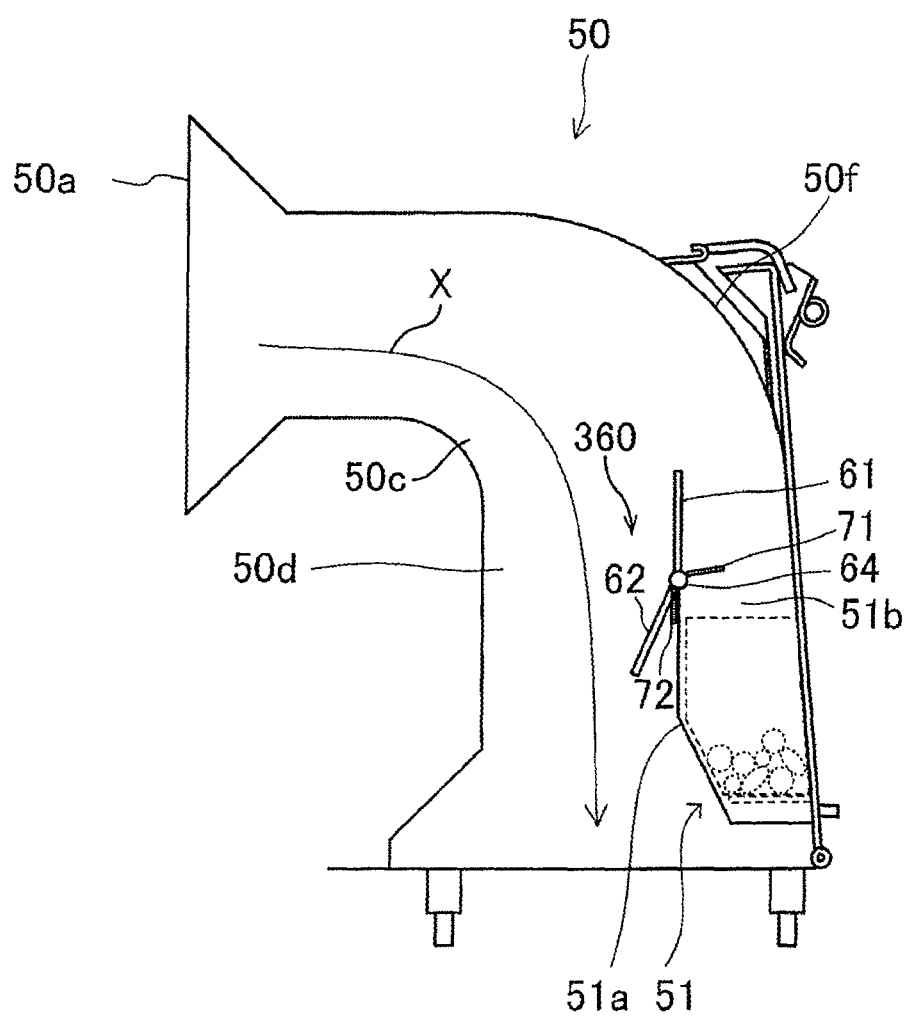
FIG. 10 is a cross-sectional rear view showing a normal wind passing through an air passage according to a fourth embodiment of the present invention.
Figure 11:
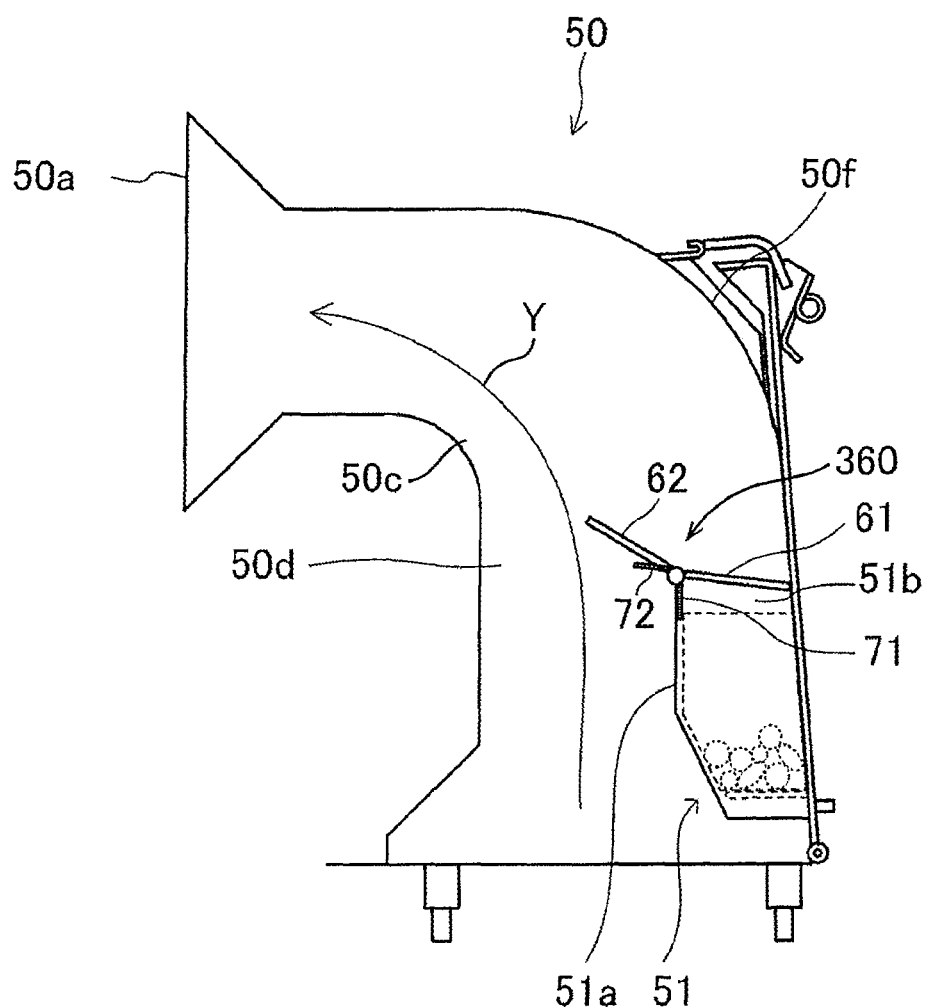
FIG. 11 is a cross-sectional rear view showing a reverse wind passing through the air passage according to the fourth embodiment.

FIGS. 10 and 11 show the inside of an intake cylinder 50 of a construction machine 10 according to a fourth embodiment of the present invention. In the fourth embodiment, a dust collection pocket 51 and a turning member 360 are provided in an intake cylinder 50, and the turning member 360 includes a lid section 61 and a wind receiving section 62, similarly to the first embodiment; however, the turning member 360 differs from the turning member 60 according to the first embodiment in that the turning member 360 further includes a close-position stopper 71 and an open-position stopper 72.

The close-position stopper 71 protrudes from the support shaft 64 of the turning member 360 with a smaller dimension than that of either of the lid section 61 and the wind receiving section 62, configured to be turned around the support shaft 64 integrally with the lid section 61 and the wind receiving section 62. The position of the close-position stopper 71 is set, as shown in FIG. 11, so as to allow the close-position stopper 71 to come into contact with the inner surface of the partition wall 51a prior to the lid section 61, accompanying the turn of the turning member 360 from the open position to the close position, to thereby fix the close position of the turning member 360.

The open-position stopper 72 protrudes from the support shaft 64 of the turning member 360 with a smaller dimension than that of either of the lid section 61 and the wind receiving section 62, configured to be turned around the support shaft 64 integrally with the lid section 61 and the wind receiving section 62. The position of the open-position stopper 72 is set, as shown in FIG. 10, so as to allow the open-position stopper 72 to come into contact with the outer surface of the partition wall 51a prior to the wind receiving section 62, accompanying the turn of the turning member 360 from the close position to the open position, to thereby fix the open position of the turning member 360.

Coming into contact with the inner surface of the partition wall 51a at the close position where the lid section 61 closes the opening 51b, the close-position stopper 71 can position the turning member 360 at the close position and prevent the lid section 61 from colliding with the partition wall 51a. Besides, coming into contact with the outside of the partition wall 51a prior to the wind receiving section 62 at the open position where the lid section 61 opens the opening 51b, the open-position stopper 72 can position the turning member 360 at the open position and prevent the wind receiving section 62 from colliding with the partition wall 51a.

The close-position stopper 71 and the open-position stopper 72, each having the dimension smaller than that of either of the lid section 61 and the wind receiving section 62 in the turning radius direction, can prevent the lid section 61 and the wind receiving section 62 from colliding with the partition wall 51a with a reduced increase in the moment of inertia of the entire turning member 360.

Although the material of the turning member 360 is not limited, it is preferable that each of the close-position stopper 71 and the open-position stopper 72 is made of a material having a specific gravity smaller than that of either of the lid section 61 and the wind receiving section 62. This allows the entire turning member 360 to have a further reduced moment of inertia.

The construction machine according to the present invention is not limited to a crawler-type hydraulic excavator as shown in FIG. 1 but allowed to be another construction machine such as a wheel-type hydraulic excavator or a mobile crane.

The cooling fan according to the present invention only has to be able to generate both normal wind and reverse wind, thus not limited to one configured to generate normal wind by the rotation in the normal rotational direction and to generate the reverse wind by the rotation in the reverse rotational direction, like the cooling fan 33. For example, switching between the normal wind and the reverse wind can be performed also by a change in the angle of the blades constituting the cooling fan.

The above embodiments are illustrative in all respects only and should not be construed as limiting. Moreover, all modifications and variations that fall within the scope of equivalents of the appended claims are within the scope of the present invention.

As described above, there is provided a construction machine capable of reliably cleaning a dust-proof filter and collecting foreign matter. Provided is a construction machine including: a machine room that houses an engine; a cooler disposed inside the machine room to cool the engine; an air passage forming member that forms an air passage from an intake port to the machine room; a cooling fan; a dust-proof filter; a dust collection pocket; and a turning member. The cooling fan is capable of generating both a normal wind that flows from the intake port toward the cooler through the air passage and a reverse wind that flows from the cooler toward the intake port through the air passage, located downstream of the cooler with respect to a normal wind direction in which the normal wind flows, and configured to blow away foreign matter adhering to the dust-proof filter by the reverse wind. The air passage forming member includes a curved section having a curved shape in the middle of the air passage, the curved section having a shape capable of separating foreign matter that passes through the curved section from the normal wind by use of the inertia of the foreign matter. The dust-proof filter is provided between the air passage forming member and the cooler to capture foreign matter contained in the normal wind. The dust collection pocket is located at a position shifted downstream in the normal wind direction along the normal wind direction from an inner wall surface of an outer corner part of the curved section. The dust collection pocket has an opening that opens to an upstream side in the normal wind direction and a bottom that closes on a downstream side in the normal wind direction, being configured to take in and collect the foreign matter separated in the curved section through the opening. The turning member includes a lid section capable of closing the opening, provided in the air passage forming member so as to be turnable about a turning axis intersecting the normal wind direction to be thereby moved between an open position and a close position. The lid section opens the opening in the open position and closes the opening in the close position. The turning member is configured to be turned to the open position by the normal wind and to be turned to the close position by the reverse wind.

In the construction machine, the curved section of the air passage forming member enables a part of or all of relatively large foreign matters out of foreign matters contained in the outside air introduced from the intake port by the normal wind to be separated from the outside air by utilization of the inertia of the foreign matter. Specifically, a part of or all of the thus large foreign matter is hindered from smoothly turning in the curved section by its remarkably great inertia compared with the air taken in through the intake port, thereby being separated from the air and brought into collision with the inner wall surface of the outer corner of the curved section. The foreign matter is advanced from the inner wall surface to the downstream side of the normal wind direction along the normal wind direction, being able to be collected into the dust collection pocket provided ahead.

Furthermore, in the above construction machine, the turn of the turning member caused by the normal wind and the reverse wind that are generated by the cooling fan allows both the collection of the foreign matter into the dust collection pocket and the prevention of the thus collected foreign matter from being scattered to be achieved. Specifically, the turning member is turned to the open position by the normal wind to make the lid section open the opening of the dust collection pocket, thereby allowing the dust collection pocket to collect foreign matter thereinto. In contrast, the turning member is turned to the close position by the reverse wind to make the lid section close the opening, thereby effectively restraining the foreign matter having been already collected in the dust collection pocket from being scattered to the outside of the dust collection pocket.

The dust collection pocket, preferably, is defined by an inner wall surface of the air passage forming member and a partition wall located on an inner side of the inner wall surface. In this mode, preferably, the turning member is turnably supported by an upper part of the partition wall. The partition wall, which is located on the inner side of the inner wall surface of the air passage forming member to be thereby likely to receive the normal wind and the reverse wind, allows the turning member supported on the upper part of the partition wall to receive the normal wind and the reverse wind more effectively to be turned.

Specifically, it is preferable that the turning member further includes a wind receiving section that receives the normal wind and the reverse wind at a position apart from the lid section in the turning direction of the turning member, and the turning member is configured to allow the wind receiving section to be turned downstream in the normal wind direction by the normal wind to thereby move the turning member to the open position and to allow the wind receiving section to be turned upstream in the normal wind direction by the reverse wind to thereby move the turning member to the close position. By such a simple configuration including only the wind receiving section in addition to the lid section, the turning member is enabled to receive the normal wind and the reverse wind efficiently to thereby automatically and reliably open and close the opening.

Preferably, the lid section and the wind receiving section form a turning direction angle therebetween with respect to the rotational direction, the turning direction angle being set so as to render each of a resistance of the lid section against the normal wind and a resistance of the wind receiving section against the reverse wind smaller in comparison with a case where the turning direction angle is 180°. Thus reducing respective resistances of the lid section and the wind receiving section against the normal wind and the reverse wind restrains the air intake efficiency by the normal wind and the cleaning efficiency of the dust-proof filter by the reverse wind from being lowered.

It is preferable that the wind receiving section includes a flexure located on an inner side of a distal end of the wind receiving section with respect to a turning radius direction of the turning member, the wind receiving section having a shape bent at the flexure, and the shape of the flexure is set so as to direct a distal side part of the wind receiving section to an upstream side in the normal wind direction, in the close position, relatively to the other part of the wind receiving section than the distal side part. The distal side part is a part closer to the distal end than the flexure. The above shape helps the wind receiving section catch the normal wind and the reverse wind, thereby enabling the turning member to be turned more reliably.

Preferably, the turning member further includes a close-position stopper and an open-position stopper. The close-position stopper protrudes from the turning axis with a smaller dimension than that of the lid section, configured to be turned about the turning axis integrally with the lid section and the wind receiving section to come into contact with an inner surface of the partition wall prior to the lid section, accompanying a turn of the turning member from the open position to the close position, to thereby position the turning member at the close position. The open-position stopper protrudes from the turning axis with a smaller dimension than that of the lid section and the wind receiving section, configured to be turned around the turning axis integrally with the lid section and the wind receiving section to come into contact with an outer surface of the partition wall prior to the wind receiving section, accompanying a turn of the turning member from the close position to the open position, to thereby position the turning member at the open position. The close-position stopper and the open-position stopper enable the turning member to be reliably positioned at the close position and the open position with a restrained moment of inertia of the entire turning member, and prevent the lid section and the wind receiving section from colliding with the partition wall, respectively.

The dust collection pocket is, preferably, provided with a ventilation hole. The ventilation hole provides communication between the air passage and the outside of the air passage forming member and the machine room to allow the inside of the dust collection pocket to be depressurized. The depressurization assists the lid section to be made close the opening of the dust collection pocket by the reverse wind, thereby enhancing a foreign matter scattering prevention effect of preventing the foreign matter having been collected in the dust collection pocket by the normal wind from being pushed out from the dust collection pocket by the wind pressure of the reverse wind.

This application is based on Japanese Patent application No. 2020-046681 filed on Mar. 17, 2020 with Japan Patent Office, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
a machine room that houses an engine;
a cooler disposed inside the machine room to cool the engine;
an air passage forming member forming an air passage extending from an intake port to the machine room and including a curved section having a curved shape in the middle of the air passage;
a cooling fan capable of generating both a normal wind that flows from the intake port toward the cooler through the air passage and a reverse wind that flows from the cooler toward the intake port through the air passage, the cooling fan being located downstream of the cooler with respect to a normal wind direction in which the normal wind flows;
a dust-proof filter provided between the air passage and the cooler to capture foreign matter contained in the normal wind;
a dust collection pocket provided at a position shifted from an inner wall surface of an outer corner part of the curved section to a downstream side in the normal wind direction along the normal wind direction, the dust collection pocket including an opening that opens to an upstream side in the normal wind direction and a bottom closing at a downstream side in the normal wind direction and configured to take in the foreign matter that has been separated from the normal wind by an inertia of the foreign matter in the curved section through the opening to collect the foreign matter; and
a turning member including a lid section capable of closing the opening, the turning member provided in the air passage forming member so as to be turnable about a turning axis intersecting the normal wind direction to be thereby moved between a close position and an open position, wherein:
the lid section opens the opening in the open position and closes the opening in the close position; and
the turning member is configured to be turned to the open position by the normal wind and to be turned to the close position by the reverse wind.

2. The construction machine according to claim 1, wherein:
the dust collection pocket is defined by an inner wall surface of the air passage forming member and a partition wall located on an inner side of the inner wall surface; and
the turning member is turnably supported by an upper part of the partition wall.

3. The construction machine according to claim 2, wherein:
the turning member further includes a wind receiving section that receives the normal wind and the reverse wind at a position apart from the lid section in the turning direction of the turning member; and
the turning member is configured to allow the wind receiving section to be turned downstream in the normal wind direction by the normal wind to thereby move the turning member to the open position and to allow the wind receiving section to be turned upstream in the normal wind direction by the reverse wind to thereby move the turning member to the close position.

4. The construction machine according to claim 3, wherein
the lid section and the wind receiving section form a turning direction angle therebetween with respect to the rotational direction, the turning direction angle being set so as to render each of a resistance of the lid section against the normal wind and a resistance of the wind receiving section against the reverse wind smaller in comparison with a case where the turning direction angle is 180°.

5. The construction machine according to claim 3, wherein
the wind receiving section includes a flexure located on an inner side of a distal end of the wind receiving section with respect to a turning radius direction of the turning member, the wind receiving section having a shape bent at the flexure, the flexure having a shape to direct a distal side part of the wind receiving section to an upstream side in the normal wind direction, in the close position, relatively to the other part of the wind receiving section than the distal side part, the distal side part being a part closer to the distal end than the flexure.

6. The construction machine according to claim 3, wherein:
the turning member further includes a close-position stopper and an open-position stopper;
the close-position stopper protrudes from the turning axis with a smaller dimension than that of the lid section, configured to be turned about the turning axis integrally with the lid section and the wind receiving section to come into contact with an inner surface of the partition wall prior to the lid section, accompanying a turn of the turning member from the open position to the close position, to thereby position the turning member at the close position; and
the open-position stopper protrudes from the turning axis with a smaller dimension than that of the lid section and the wind receiving section, configured to be turned around the turning axis integrally with the lid section and the wind receiving section to come into contact with an outer surface of the partition wall earlier prior to the wind receiving section, accompanying a turn of the turning member from the close position to the open position, to thereby position the turning member at the open position.

7. The construction machine according to claim 1, wherein
the dust collection pocket is provided with a ventilation hole that provides communication between the air passage and an outside of the air passage forming member and the machine room to allow an inside of the dust collection pocket to be depressurized.

* * * * *